(12) United States Patent
Baas et al.

(10) Patent No.: US 7,464,661 B2
(45) Date of Patent: Dec. 16, 2008

(54) METHOD AND APPARATUS FOR LAYERING SEASONING

(75) Inventors: Ian Andries Baas, Sunnybank (AU); Michael Rajendra Kalika Singh, Asquith (AU)

(73) Assignee: Frito-Lay North America, Inc., Plano, TX (US)

(*) Notice: Subject to any disclaimer, the term of this patent is extended or adjusted under 35 U.S.C. 154(b) by 924 days.

(21) Appl. No.: 10/893,425

(22) Filed: Jul. 16, 2004

(65) Prior Publication Data

US 2006/0011073 A1    Jan. 19, 2006

(51) Int. Cl.
*B05C 19/06* (2006.01)
*A23L 1/22* (2006.01)

(52) U.S. Cl. .................. 118/13; 118/19; 118/303; 118/418; 99/494; 426/289; 426/292; 426/295

(58) Field of Classification Search ............ 118/13, 118/19, 303, 418; 427/242; 99/494; 366/108; 141/100; 426/289, 292, 295; 193/2 R, 3, 193/10, 14, 20, 21, 25 E, 25 FT
See application file for complete search history.

(56) References Cited

U.S. PATENT DOCUMENTS

| | | | |
|---|---|---|---|
| 4,543,907 A | 10/1985 | Fowler | |
| 4,614,162 A | 9/1986 | Ryan et al. | |
| 5,090,593 A | 2/1992 | Ejike | |
| 5,846,324 A | 12/1998 | Marshall et al. | |
| 6,553,931 B2 | 4/2003 | Graham et al. | |
| 6,588,363 B1 | 7/2003 | Burke et al. | |
| 6,619,226 B2 | 9/2003 | Rooke | |
| 6,644,237 B2 | 11/2003 | Rooke | |
| 2003/0000460 A1 | 1/2003 | Burke et al. | |
| 2005/0193898 A1* | 9/2005 | Sus et al. | 99/407 |

* cited by examiner

*Primary Examiner*—Laura Edwards
(74) *Attorney, Agent, or Firm*—Bobby W. Braxton; Colin P. Cahoon; Carstens & Cahoon, LLP

(57) ABSTRACT

An apparatus and method for providing a layered seasoning to snack food products such as potato chips or tortilla chips using a vibratory scarf plate that is divided into two or more sections by one or more walls. A different seasoning is placed in each section. The scarf plate is placed into a rotating drum having snack food product. A seasoning from each section falls off the scarf plate to form a curtain. Each curtain provides a layer of seasoning on the snack food product.

20 Claims, 4 Drawing Sheets

METHOD AND APPARATUS FOR LAYERING SEASONING

BACKGROUND OF THE INVENTION

1. Technical Field

This invention relates to improvements in a method and apparatus for the distribution of seasonings, e.g., seasonings as placed on potato chips, corn chips, and like snack foods and more particularly, to a method and apparatus that permits layering of different seasoning materials during the manufacture of snack food items.

2. Description of Related Art

Food particulates are often added to foods, especially snack foods. Tortilla chips, pretzels, crackers, popcorn, and numerous other foodstuffs often have seasonings applied to them during processing. Seasonings used, usually in a powdered form, have included salt, cheese, chili, garlic, Cajun spice, ranch, sour cream and onion, among many others.

FIG. 1 is a schematic sectional elevation view of a prior art seasoning distribution system. FIG. 2 is a schematic sectional view taken along line 2-2 of FIG. 1. Referring to FIGS. 1 and 2, the apparatus 10 generally comprises a cylindrical drum 14 and a non-rotating horizontal seasoning dispenser. Unseasoned snack food 12 enters a cylindrical drum 14 at one end through a funnel 16. Drum 14 is tilted slightly at an angle of about 5 degrees and is axially rotated in the direction indicated by arrow 18. The speed of rotation is generally between 4 and 15 RPM. The combination of tilt and rotation causes the snack food to travel continuously down the drum to exit 20. Baffles 21 may be positioned radially on the drum perimeter to aid in mixing the snack food. A horizontal, non-rotating seasoning dispenser 22 has a tube portion 24 extending into the drum. Within the tube 24 is an auger 26 in close tolerance with the tube inner wall. The auger is rotated by a power source 28 such as an electric motor. This tumbling drum arrangement and the application in general of seasoning falling from a tube to snack food therein is well known and conventional in the art. Seasoning 30, such as barbeque, sour cream, etc., is fed to the dispenser via a hopper 32 and is conveyed along the tube 24 by the auger 26. A series of apertures in the bottom of the far end of the tube 24, opposite the hopper 32, allows the seasoning to drop by gravity onto the snack food. As indicated by arrows, the seasoning is distributed in the form of a dispersion "curtain".

The seasoning dispenser 22 may be positioned offset from the cross-sectional center of the drum, as shown in FIG. 2, in order to distribute the seasoning over the location of maximum concentration of snack food. Because of the drum rotation, the snack food tends to migrate up the drum wall, and thus the maximum concentration is located at a point other than the lowest portion of the drum. The optimum position for the dispenser is, of course, dictated by the degree of migration of the snack food, which in turn is dependent on the speed of rotation and tilt angle of the drum, and the size and number of baffles along the drum perimeter. Those skilled in the art can readily ascertain the proper location for the dispenser based upon a given set of the above process parameters.

Achieving the optimum compromise between uniform seasoning coverage of the snack product along with minimum product breakage requires careful selection of tumbler drum size. A longer tumbler drum can result in higher, undesirable product breakage.

One problem with this prior art apparatus is the difficulty of providing a layered seasoning. For example, sour cream and onion seasonings often consist of a larger parsley flake seasoning mixed in with the smaller fine particulate seasoning. The smaller fine particulate seasoning, however, can cover and obscure the parsley making it appear as though less parsley is present than actually is present. Further, some fine, particulate seasoning may partially obscure the parsley flake, which can dull or dilute the green color. Thus, it is difficult to produce a snack food product having a clear color contrast. Unfortunately, prior art seasoning distribution systems currently require the two seasonings to be mixed and applied then applied to the substrate.

One solution to this problem is to add a second seasoning dispenser 22 having a series of apertures in the bottom of the near end of the tube 24, closer to the hopper 32, but situated such that seasoning curtain resides within the drum. Unfortunately, the space constraints of the flavoring drum make the use of multiple screw conveyors impractical, and also the cost of such a system may be prohibitive.

Another solution may be to use a second apparatus 10 as depicted in FIG. 1 in series with a first apparatus 10 and thereby route the substrate through two seasoning drums having different seasonings. This solution, however, fails because in addition to significant capital costs for a second apparatus, such a configuration would result in higher than desirable product breakage.

Similarly, patents that relate to snack food seasoning in the prior art all fail to provide an economical apparatus that provides a layered seasoning on a snack food substrate. For example, U.S. Pat. Nos. 4,543,907, 5,090,593, 5,846,324, 6,619,226, and 6,588,363 all fail to disclose an apparatus capable of providing a layered seasoning on a snack food substrate.

Consequently a need exists for an apparatus that can provide a layered, uniform seasoning coverage onto snack products while minimizing product breakage. The method and apparatus should be adaptable to an existing product line where seasoning is applied to a snack food substrate. In addition, the apparatus should not result in an increase in product breakage. Thereby snack products with uniform layered seasoning coverage can be produced in an economical manner while avoiding product breakage.

SUMMARY OF THE INVENTION

The invention relates to a method and apparatus for layering a plurality of seasonings upon a snack food product. In one aspect, the invention comprises a rotating drum having a snack food product, and a vibratory scarf plate having a wall that divides the scarf plate into a first section and a second section. The first section terminates at a first edge and transports a first seasoning. The second section terminates at a second edge and transports a second seasoning. Scarf plate vibration causes the respective seasoning to fall off its respective edge to a first seasoning curtain and a second seasoning curtain. As snack food passes under the first seasoning curtain, the snack food acquires a first layer of seasoning. Similarly, when the snack food passes under the second seasoning curtain, the snack food acquires a second layer of seasoning.

Hence, this invention produces a method and apparatus whereby difference seasonings can be layered upon a snack food product to achieve a snack food product having superior aesthetic or organoleptic properties. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 3b is a schematic sectional elevation view of the seasoning distribution system in depicted in FIG. 3a.

FIG. 3c is a schematic top view of the seasoning distribution system depicted in FIG. 3a.

FIG. 3d is a product outlet end view of the seasoning distribution system depicted in FIG. 3a.

FIG. 4b is a product outlet end view of the seasoning distribution system depicted in FIG. 4a.

DETAILED DESCRIPTION

Figure 1:
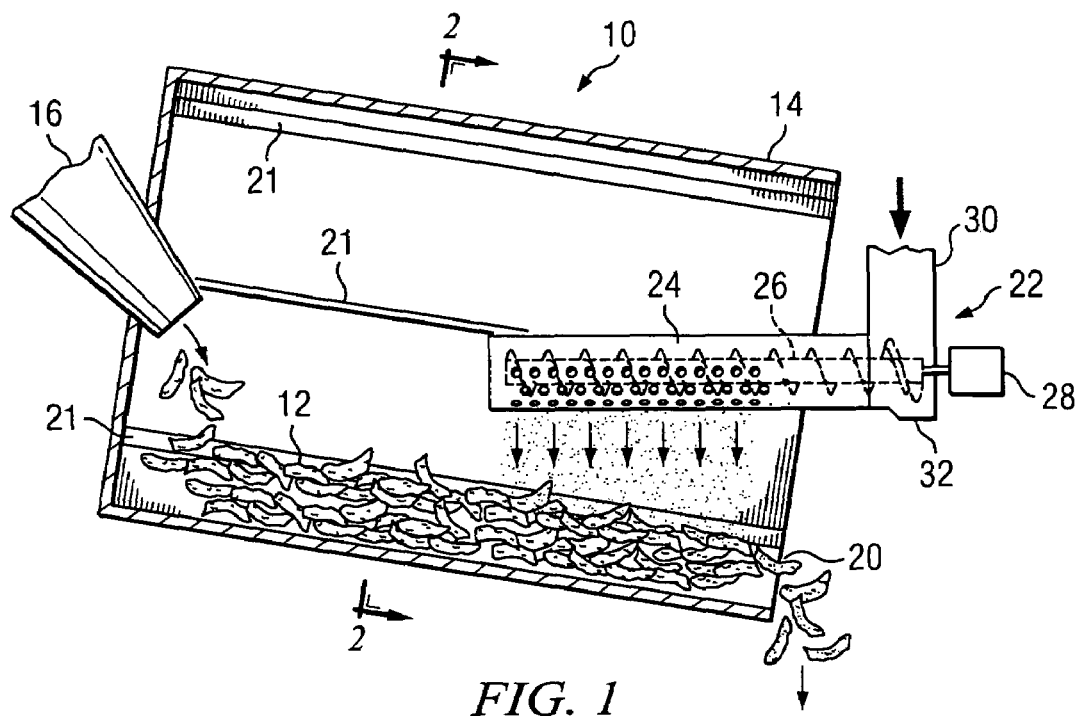
FIG. 1 is a schematic sectional elevation view of a prior art seasoning distribution system.
Figure 2:
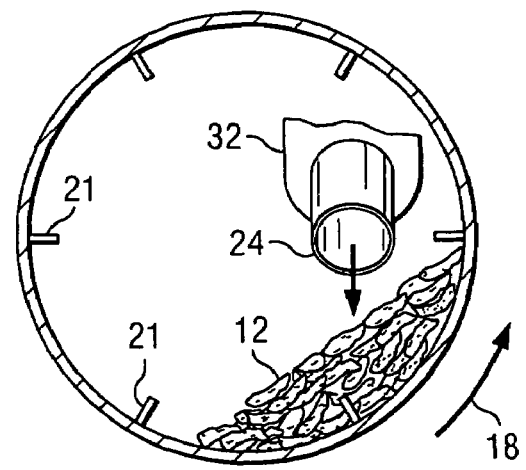
FIG. 2 is a schematic sectional view taken along line 2-2 of FIG. 1.
Figure 3A:
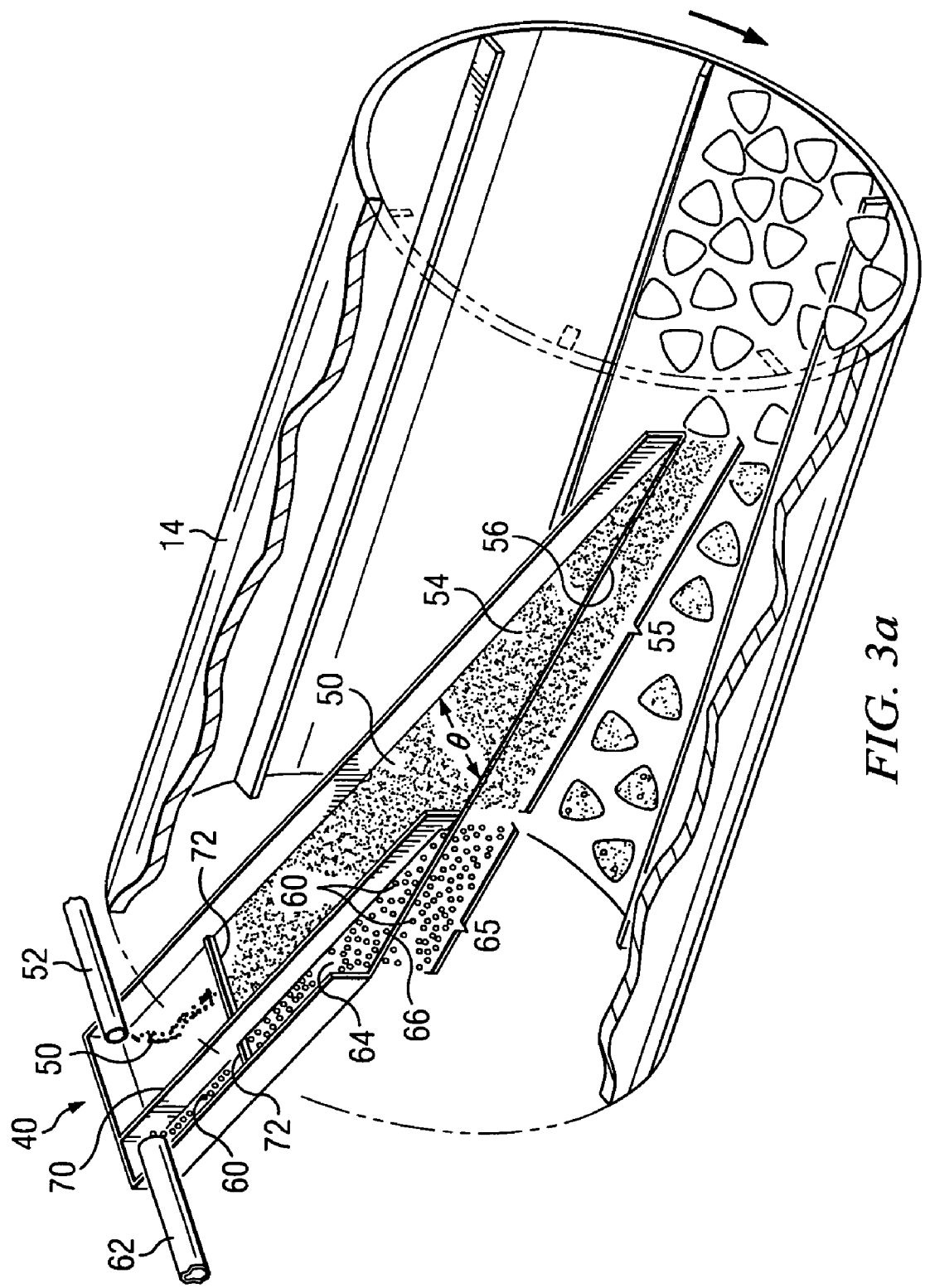
FIG. 3a is a partial cut-away perspective view of one embodiment of a seasoning distribution system in accordance with one embodiment of the present invention.

FIG. 3a is a partial cut-away perspective view of a seasoning distribution system in accordance with one embodiment of the present invention. A vibratory scarf plate 40 can be partially inserted into a seasoning drum 14. A vibratory scarf plate 40 is available from Wright Machinery (http://www.wright.co.uk) of Oxbridge, England can be used. A first seasoning, flavoring or illustrative bits 50 can be metered from a first seasoning delivery device 52 (partially shown) onto a first scarf plate section 54. Similarly, a second seasoning, flavoring or illustrative bits 50 can be metered from a second seasoning delivery device 62 (partially shown) onto a second scarf plate section 64. Although discharge portion of the seasoning device 52 62 is depicted as a round pipe, any way of placing metered seasoning onto the respective scarf plate sections can be used. For example, an endless conveyor or a half pipe can be used. The seasoning delivery device 52 62 can be a volumetric or gravimetric feeder. A metering screw feeder, available from Rospen Industries (http://www.rospen.com/) of Oldends Lane, Stonehouse, Gloucestershire can be used. Equivalent feeders are also available from Acrison (http://www.acrison.com/) of Moonachie, N.J.

A wall 70 disposed within the scarf plate 40 defines a first scarf plate section 54 and a second scarf plate section 64. Termination of the first scarf plate section 54 within the seasoning drum 14 defines a first edge 56. Similarly the second scarf plate section 64 terminates at a second edge 66. The first scarf plate section 54 is the portion of the scarf plate 40 that transports the first seasoning 50 from the first seasoning delivery device 52 to the first edge 56. Similarly, the second scarf plate section 64 is the portion of the scarf plate 40 that transports the second seasoning 60 from the second delivery device 62 to the second edge 66. The wall 70 ensures no mixing of the first seasoning 50 with the second seasoning 60 within the confines of the scarf plate 40.

In one embodiment, the first edge 56 when viewed from above, forms a bias cut or diagonal having an angle Θ that is less than about 45 degrees. Similarly, in one embodiment, the second edge 66, when viewed from above, forms and angle that is less than 45 degrees. In the embodiment shown in FIG. 3a, the first edge 56 and second edge 66 comprise equal angles and form a continuous edge. However, it should be noted that the angles can be different and the first edge 56 and second edge 66 may be non-contiguous. In one embodiment, each edge 56 66 comprises a knife-like edge having a small bevel on the underside.

Upon exit from the first seasoning delivery device 52, scarf plate 40 vibration causes the first seasoning 50 to travel from the seasoning end of the scarf plate 40 along the first scarf section 54 to the first edge 56. The seasoning 50 then falls off the first edge 56 to create a first seasoning curtain 55. Similarly, upon exit from the second seasoning delivery device 62, scarf plate vibration 40 causes the second seasoning 60 to travel from the seasoning end of the scarf plate 40 along the second scarf section 64 to the second edge 66.

Figure 3B:
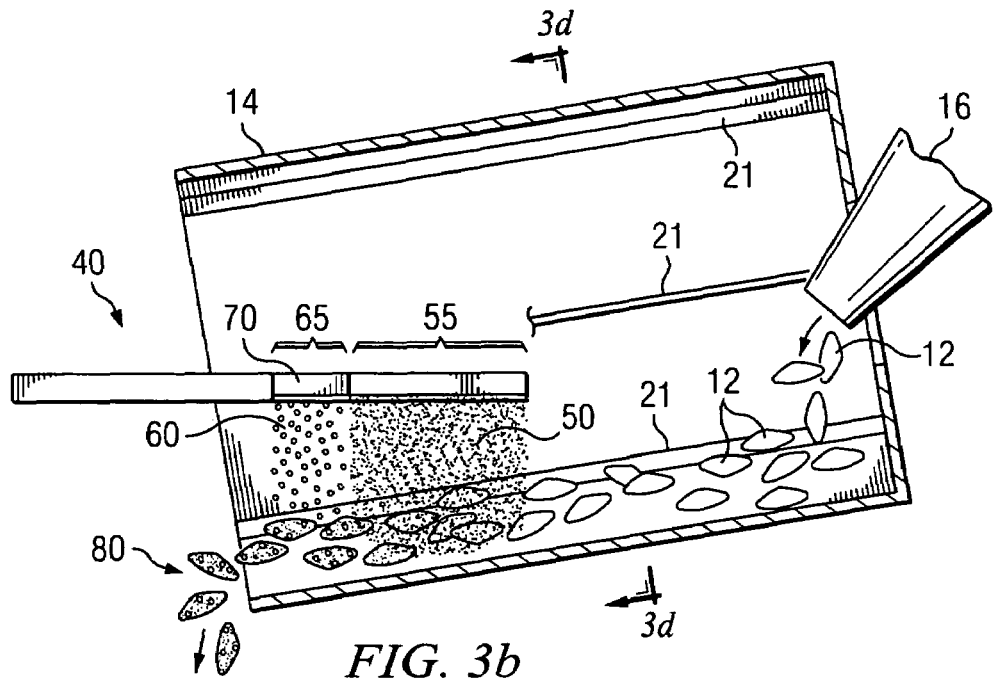

FIG. 3b is a schematic sectional side view of the seasoning distribution system in depicted in FIG. 3a. Unseasoned snack food 12 enters the rotating cylindrical drum 14 at one end through, for example, a funnel 16. Due to drum 14 rotation and tilt, the snack food travels continuously down the inside of the drum 14 towards the exit 80. Baffles 21 can be positioned to aid in mixing the snack food. A snack food disposed within the upstream section of the drum 14 is first contacted with the first seasoning 50 as it travels beneath the first seasoning curtain 55. The snack food 12 now having a first seasoning layer is next contacted with the second seasoning 60 as it travels beneath the second seasoning curtain 65 in the seasoning drum 14. In one embodiment, the scarf plate 40 is substantially level in both the longitudinal and transverse directions.

Figure 3C:
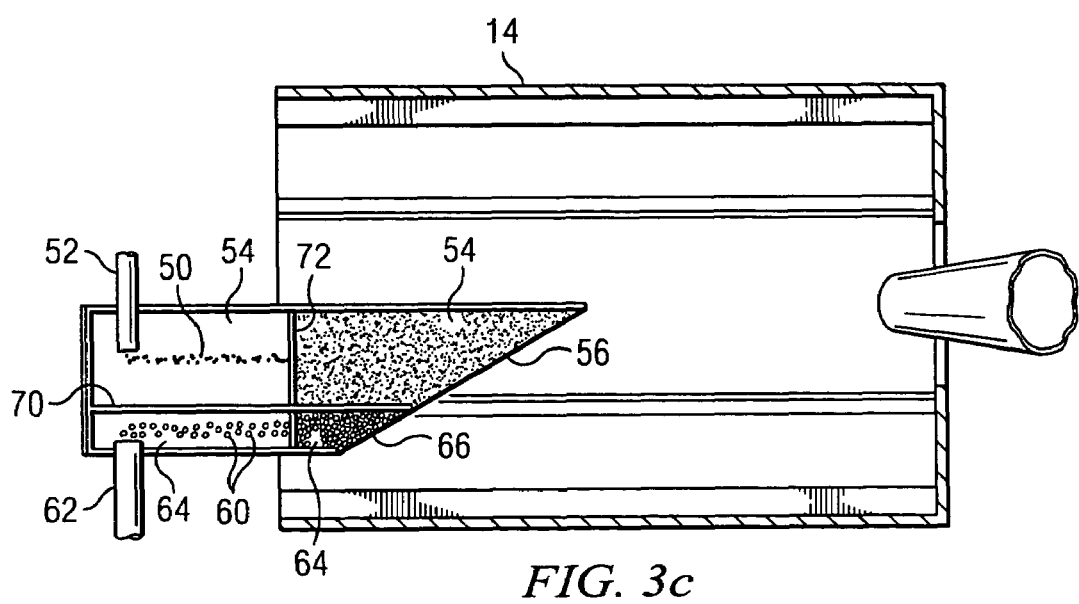

FIG. 3c is a sectional top view of the seasoning distribution system depicted in FIG. 3a. As shown by FIG. 3c, once seasoning 50 60 exits its respective seasoning delivery device 52 62, the seasoning can tend to pile immediately below its respective delivery device. Scarf plate 40 vibration alone may not uniformly spread the seasoning about the width of either scarf plate section 54 64. If seasoning 50 60 is not uniformly distributed about the width, it may impact seasoning curtain 55 65 uniformity. Thus, in one embodiment (not shown), the seasoning delivery device 52 62 terminates across the width of the respective scarf plate section to minimize piling and provides a uniform amount of seasoning about the width of the scarf plate section 54 64.

In an alternative embodiment, a spreader bar 72 is mated to the bottom of both the first scarf plate section 54 and the second scarf plate section 64 and extends the width of each section. The spreader bar 72, in conjunction with the vibration caused by the scarf plate 40, functions as a dam and causes seasoning to thinly spread out about the width of the respective scarf plate section 54 64 as seasoning 50 60 flows over the spreader bar 72. The spreader bar 72 thus helps to uniformly spread the seasoning about the width of each scarf plate section 54 64. Although the spreader bar 72 height can vary depending upon such factors including, but not limited to, vibration frequency, vibration pattern, spreader bar shape, and seasoning characteristics such as seasoning size and density, the height, in one embodiment, ranges from about 3 millimeters to about 6 millimeters. It is also preferable that the surface of the respective scarf plate sections 54 64 be highly polished to facilitate even flow of the seasoning.

The location of the wall 70 separating the first scarf plate section 54 and the second scarf plate section 64 can be based on a number of factors including, but not limited to, the physical properties (e.g. density, particle size) of the first and second seasoning, the desired finished appearance of the seasoned snack product, and the desired organoleptical properties (taste, smell, and texture) of the desired finished product. The physical properties of the seasonings may influence wall 70 placement because the rate of travel and thus final seasoning amount may be affected by the density and/or particle size of the seasoning. The desired finished appearance may influence wall 70 placement based upon the desired aesthetic appearance produced by the relative placement density of the first seasoning 50 and second seasoning 60 on the snack food product. The desired organoleptical properties may influence wall 70 placement based upon the desire for a snack food product to vary the intensity of an initial taste, smell, or texture aspect of a snack food product. For example, a seasoning having a strong smell may be used as a second seasoning 60. In such a case, the second edge 66 may be longer than the first edge 56. Thus, depending upon the desired finished product, the wall 70 can be placed anywhere within the scarf plate 40.

Figure 3D:
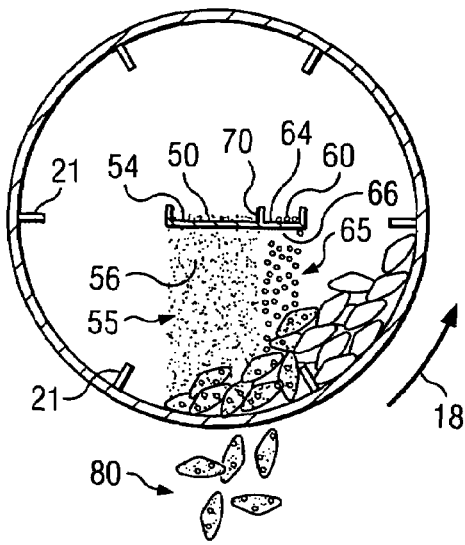

FIG. 3d is a product outlet end view of the seasoning distribution system depicted in FIG. 3a. It should be noted that, unlike clothes in a household clothes dryer, the snack food product after it migrates upward with drum rotation 18, gently rolls or slides down the side of the drum 14 and is generally not "spun" or "flung" around inside the seasoning drum 14. Thus, the figure substantially portrays the relative location of the snack food product bed inside the seasoning drum 14. In one embodiment, a snack food piece tumbles (follows the drum rotation up the sidewall of the drum and then rolls back down) between about 2 and about 9 times as the snack food navigates through the first curtain 55. In one embodiment, a snack food piece tumbles about 2 times and about 9 times as the snack food navigates through the second curtain 65. While snack food product generally is not carried beyond the top half of the drum, it is possible for seasoning to adhere to the sides of the drum. The potential then exists for such seasoning to fall onto the scarf plate 40. This is undesirable because of the potential for the first seasoning 50 to fall into the second scarf plate section 64 or for the second seasoning 60 to fall into the first scarf plate section 54, resulting in undesirable mixing of seasonings. Thus, in one embodiment, a protective hat (not shown) is disposed above the scarf plate 40 to shield the scarf plate from any potential contaminants. The scarf plate 40 is preferably placed off-center within the drum such that the seasoning curtains 55 65 fall substantially upon the snack food product bed below.

Although FIGS. 3a-3d depict only one inner wall 70 on the scarf plate to form two scarf plate sections, those skilled in the art will recognize that additional walls 70 could be placed in the scarf plate 40 to increase the number of layers of seasoning disposed upon a seasoned snack food product.

Figure 4B:
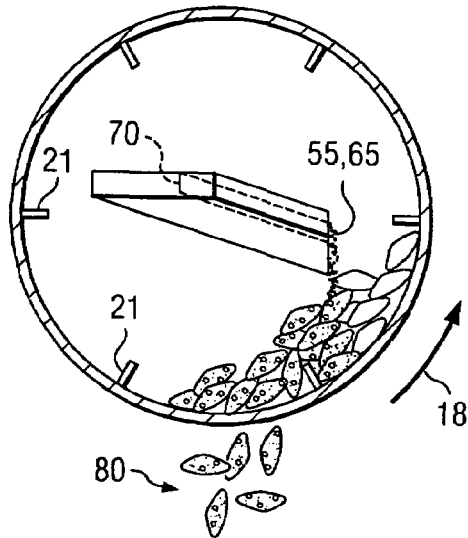
Figure 4A:
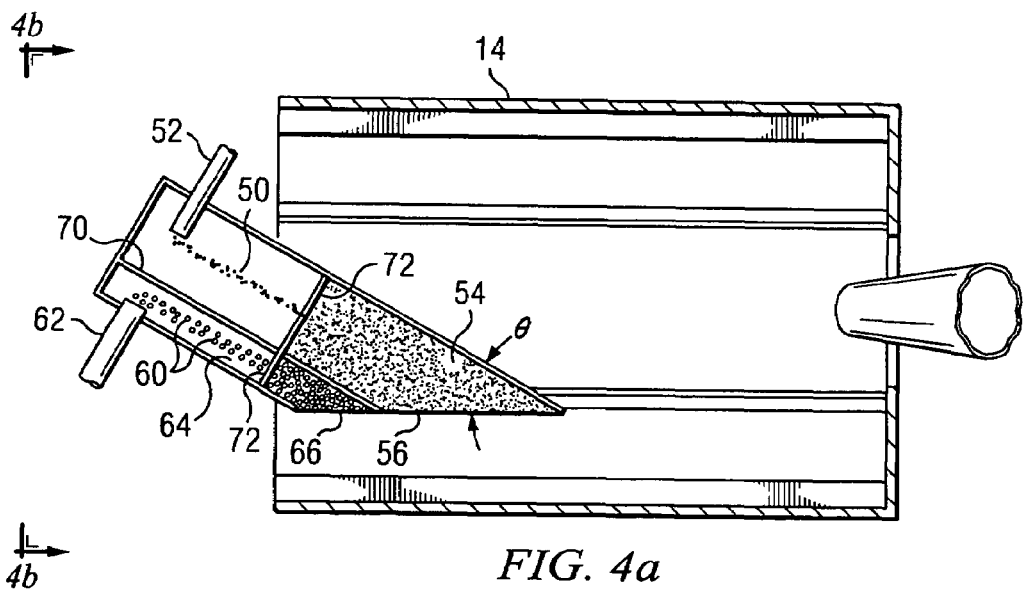
FIG. 4a is a schematic top view of the seasoning distribution system in accordance with one embodiment of the present invention.

FIG. 4a is a schematic top view of the seasoning distribution system in accordance with an alternative embodiment of the present invention. FIG. 4b is a product outlet end view of the seasoning distribution system depicted in FIG. 4a. In this embodiment, the scarf plate 40 is placed into the drum at a diagonal and the first scarf plate edge 56 and second scarf plate edge 66 are substantially parallel to the longitudinal axis of the drum 14. As a result, the first curtain 55 and second curtain 65 also reside in a plane parallel to the longitudinal axis of the drum 14. In such an embodiment, the angle Θ can be less than about 30 degrees, more preferably less than about 20 degrees and most preferably less than about 10 degrees to permit optimal placement of the seasoning curtains over the snack food within the drum.

Figure 5:
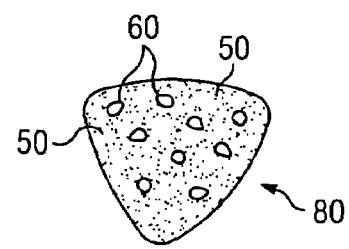
FIG. 5 is a top view of a snack product seasoned in accordance with one embodiment of the present invention.

FIG. 5 is a top view of a snack food product seasoned in accordance with one embodiment of the present invention. As indicated by the figure a snack food product having a layered seasoning is achieved. In the embodiment shown, the second seasoning 60 providing a second layer is disposed upon first seasoning 50 providing a first layer.

In one embodiment, the second seasoning 60 comprises an average particle size that is different from the first seasoning 50. In one embodiment the second seasoning comprises a texture that is different from the first seasoning. In one embodiment, the second seasoning comprises a color that is different from the first seasoning. In one embodiment, the second seasoning comprises a flavor different from the first seasoning. In one embodiment, the second seasoning comprises barley.

The instant invention results in a snack food product having a layered seasoning. There are several advantages with this invention. First, because the second seasoning is not obscured from mixing with the first seasoning, a lesser amount of a second seasoning can be used for the same apparent density. Second, the invention provides for a way to provide a more aesthetically pleasing snack food product. Because the second seasoning is not obscured by the first seasoning, the snack food product is able to exhibit a clear color contrast. Third, the invention provides a way to season a snack food with two or more distinct colors. Fourth, the invention provides a way to maximize the texture attributes of different seasonings. For example, if it is desired to have an outer (second) seasoning having a rougher texture and an inner (first) seasoning having a fine texture to produce a desired mouthful, the rough outer texture is not diluted by mixing with the fine inner texture seasoning. Further, in such an example, because the second seasoning is the outermost seasoning, addition of a second seasoning having strong texture attributes can be more fully appreciated upon initial consumption by a consumer. Fifth, because the second seasoning is the outermost seasoning, the first seasoning and second seasoning flavors can be varied to maximize desired flavor profiles.

While this invention has been particularly shown and described with reference to a preferred embodiment, it will be understood by those skilled in the art that various changes in form and detail may be made therein without departing from the spirit and scope of the invention.

What is claimed is:

1. An apparatus for distribution of at least two seasonings in a layered fashion on snack food product, said apparatus comprising:
    a drum for receiving snack food product, said drum having a seasoning receiving end;
    a vibratory scarf plate for receiving at least two seasonings, said vibratory scarf plate extending inside said drum, wherein said scarf plate further comprises:
        a first scarf plate section having a first discharge edge;
        a second scarf plate section having a second discharge edge; and
        a wall separating said first scarf plate section and said second scarf plate section,
    wherein said wall ensures no mixing of said at least two seasonings within said scarf plate,
    wherein said first discharge edge is located further from said seasoning receiving end than said second discharge edge; and wherein said first scarf plate section and said second scarf plate section are in substantially the same horizontal plane.

2. The apparatus of claim 1 wherein said scarf plate further comprises a spreader bar.

3. The apparatus of claim 1 wherein said first discharge edge and said second discharge edge are contiguous.

4. The apparatus of claim 1 wherein said first discharge edge comprises an angle of less than about 45 degrees.

5. The apparatus of claim 1 wherein said second discharge edge comprises an angle or less than about 45 degrees.

6. The apparatus of claim 1 wherein said first edge is substantially parallel to a longitudinal axis of said drum.

7. The apparatus of claim 1 wherein said second edge is substantially parallel to a longitudinal axis of said drum.

8. The apparatus of claim 1 wherein said first edge is at a diagonal to a longitudinal axis of said drum.

9. The apparatus of claim 1 wherein said second edge at a diagonal to a longitudinal axis of said drum.

10. A method for layering a second seasoning on a first seasoning, said method comprising the steps of:
    a) providing the apparatus of claim 1;
    b) providing a first seasoning from a first delivery device onto said first scarf plate thereby creating a first curtain that flows over said first discharge edge;
    c) providing a second seasoning from a second delivery device onto said second scarf plate section thereby creating a second curtain that flows over said second discharge edge;
    d) placing snack food product in said drum;
    e) contacting said snack food product with said first seasoning curtain thereby making a snack food having a first seasoning layer; and
    f) contacting said snack food product having said first seasoning layer with said second seasoning curtain.

11. The method of claim 10 wherein said first seasoning comprises a different average particle size than said second seasoning.

12. The method of claim 11 wherein said first seasoning comprises a smaller average particle size that said second seasoning.

13. The method of claim 10 wherein said first seasoning comprises a first color and said second seasoning comprises a second color.

14. The method of claim 10 wherein said first seasoning comprises a different texture than said second seasoning.

15. The method of claim 10 wherein said first curtain is substantially parallel to a longitudinal axis of said drum.

16. The method of claim 10 wherein said second curtain is substantially parallel to a longitudinal axis of said drum.

17. The method of claim 10 wherein said first curtain is substantially parallel to a longitudinal axis of said drum.

18. The method of claim 10 wherein said second curtain is substantially parallel to a longitudinal axis of said drum.

19. The method of claim 10 wherein said first curtain is at a diagonal to a longitudinal axis of said drum.

20. The method of claim 10 wherein said second curtain is at a diagonal to a longitudinal axis of said drum.

* * * * *